(12) United States Patent
Mahbub et al.

(10) Patent No.: US 6,489,406 B1
(45) Date of Patent: Dec. 3, 2002

(54) UNSATURATED POLYESTER RESIN AND THE USE OF IT

(75) Inventors: Paul Mahbub, Porvoo (FI); Karri Airola, Porvoo (FI); Eija Valtonen, Porvoo (FI)

(73) Assignee: Ashland Inc., Covington ( * ) Notice: Subject to any disclaimer, the term of this patent is extended or adjusted under 35 U.S.C. 154(b) by 0 days.

(21) Appl. No.: 09/806,337

(22) PCT Filed: Sep. 29, 1999

(86) PCT No.: PCT/FI99/00799

§ 371 (c)(1),
(2), (4) Date: Mar. 29, 2001

(87) PCT Pub. No.: WO00/18820

PCT Pub. Date: Apr. 6, 2000

(30) Foreign Application Priority Data

Sep. 29, 1998 (FI) .................................................. 982089
Feb. 2, 1999 (FI) .................................................. 990195

(51) Int. Cl.$^7$ .................................................. C08F 20/00
(52) U.S. Cl. ................. 525/445; 528/275; 528/283; 528/300; 528/301; 528/302; 528/306; 528/307; 528/308; 528/308.6; 525/437; 525/444; 524/40; 524/41; 524/42; 524/43
(58) Field of Search ................................. 528/275, 283, 528/300, 301, 302, 306, 307, 308, 308.6; 525/437, 444, 445; 524/40, 41, 42, 43

(56) References Cited

U.S. PATENT DOCUMENTS

| | | |
|---|---|---|
| 4,343,932 A | 8/1982 | Prooi et al. |
| 4,499,235 A | 2/1985 | Verwer et al. |
| 4,673,758 A | 6/1987 | Meixner et al. |
| 4,983,712 A | 1/1991 | Meixner et al. |
| 5,198,529 A | 3/1993 | Takiyama et al. |
| 5,688,867 A | 11/1997 | Scheibelhoffer et al. |
| 5,696,225 A | 12/1997 | Cai et al. |

FOREIGN PATENT DOCUMENTS

| | | |
|---|---|---|
| EP | 0031977 A1 | 7/1981 |
| EP | 0293754 A1 | 12/1988 |
| EP | 0506417 A3 | 9/1992 |
| FI | 74720 | 11/1987 |
| GB | 792854 A | 4/1958 |
| GB | 2140441 A | 11/1984 |
| JP | 4253717 A | 1/1991 |
| JP | 5186572 A | 1/1992 |
| KR | 9411772 B1 | 7/1991 |
| WO | 9823663 A1 | 6/1998 |
| WO | WO 00/18820 | * 4/2000 |

* cited by examiner

Primary Examiner—Samuel A. Acquah
(74) Attorney, Agent, or Firm—Birch, Stewart, Kolasch & Birch, LLP

(57) ABSTRACT

The invention relates unsaturated polyester resins for the manufacture of subzero flexible, weather-resistant products. The liquid unsaturated polyester resin comprises a linear unsaturated polyester obtained by reacting 5–30 mol % of one or more ethylenically unsaturated dicarboxylic acids (A), 20–45 mol % of one or more other aliphatic or aromatic acids (B) and 40–60 mol % of two or more polyhydric alcohols and 30–60 wt % of one or more reactive monomers. The linear unsaturated polyesters have a cone and plate viscosity (I.C.I.) of 2 ps/125° C.–20 ps/125° C. and a molecular weight Mw of 20,000–100,000. The invention also relates to a process for the manufacture of such unsaturated polyester resins and to the use of them in applications wherein good adhesion to supporting material and flexibility at ambient and especially at low temperatures are needed.

21 Claims, No Drawings ic # UNSATURATED POLYESTER RESIN AND THE USE OF IT

This application is the national phase under 35 U.S.C. § 371 of PCT International Application No. PCT/FI99/00799 which has an International filing date of Sep. 29, 1999, which designated the United States of America.

The invention relates to unsaturated polyester resins and in particular to weather-resistant unsaturated polyester resin based products with excellent flexibility and to the use of the said resins in applications, such as concrete sealants and flooring resins. Additionally, the invention relates to a process for the manufacture of such unsaturated polyester resins.

Flexible unsaturated polyesters for coating, waterproofing and sealing applications have been traditionally processed from dicarboxylic acid and polypropylene oxides or polyethylene oxides. Part of the acid has to be unsaturated in order to have curing properties with normal peroxides or other radical initiators.

A method and a resinous product adapted for sealing pores in porous metal articles are disclosed in GB 792 854. More specifically, this patent describes a method for sealing pores in porous metal articles by impregnating the metal with a water-dispersible polymerizable impregnating composition comprising water-dispersible polyester and a polymerizable aryl monomer. The water-dispersible polyester comprises the product of esterifying a glycol with an ethylenically unsaturated dicarboxylic acid. The polymerizable aryl monomer is styrene or vinyl toluene and it is present in an amount from one-third to one time the total weight of the polyester.

An unsaturated polyester resin used as waterproof lining material of a roof floor and indoor floor and as filling material of a cable joint portion is described in KR 9411772. The unsaturated polyester resin is produced from diethylene glycol, propylene glycol, phthalic acid, maleic acid and benzoic acid with conventional additives.

Japanese patent application JP 04 253 717 discloses the use of polyglycols in a combination with aromatic dicarboxylic acids, such as isophthalic or terephthalic acid, and maleic acid. The resins are diluted with styrene to 40% and cured with methyl ethyl ketone peroxide and Co-naphtenoate to obtain a flexible unsaturated polyester resin for use as coating in engineering and construction.

Another Japanese patent application JP 05 186 572 A2 describes the preparation of waterproofing materials with good flexibility. The resin is composed of adipic acid, fumaric acid and Bisphenol A combined at the second stage with a maleic acid-DCPD derivative. The resin is diluted with styrene and cured as described in the preceding reference.

U.S. Pat. No. 5,696,225 describes a three step method of processing a flexible resin. At the first stage, an acid-terminated polyester is prepared, the chains are extended at the second stage with polypropylene oxides and, at the third stage, the compounded resin is diluted with styrene and cured with a peroxide/Co-naphtenoate system. This publication also refers to trials to improve flexibility, weather-resistance and duration of good performance. Typical improvements relate to variations of monomers and by copolymers, e.g. blending unsaturated polyester with vinyl esters and epoxy resins.

A major problem with prior art unsaturated polyester resin products is high water absorption, which affects the product by reducing flex strength and elongation at room temperature and at temperatures down to −20° C., which cause loss of flexibility and affect severely the stability of the product. Thus, there is a need for resins that would perform well, when cured, in demanding weather-conditions and retain flexibility and stability also at very low temperatures.

An object of this invention is to provide a linear unsaturated polyester with a high molecular weight and an unsaturated polyester resin for the manufacture of subzero flexible, weather-resistant unsaturated polyester based products. Another object of this invention is the use of the unsaturated polyester resin in applications wherein good chemical resistance, weather-resistance, subzero flexibility and water resistance are needed and high impact resistance is required, such as concrete sealants, flooring resins, coating resins, in gelcoats or as such combined with reinforcement to form flexible reinforced plastic parts. A further object of this invention is to provide a method for the manufacture of a linear unsaturated polyester with a high molecular weight and of an unsaturated polyester resin for the manufacture of a subzero flexible, weather-resistant unsaturated polyester based products.

The characteristic features of the linear unsaturated polyester, of the unsaturated polyester resin, the use thereof and the method for the manufacture thereof are set forth in the claims.

It has been surprisingly found that in processing of linear unsaturated polyesters and unsaturated polyester resins for the manufacture of a subzero flexible, weather-resistant, unstaurated polyester based products, the use and the combination of glycolic components play an important role in order to achieve a linear unsaturated polyester with a high molecular weight, and so do also extended processing periods in order to achieve very low acid values.

The linear unsaturated polyesters are prepared by allowing a combination of (A) ethylenically unsaturated dicarboxylic acid, such as maleic acid, maleic anhydride, fumaric acid or mixtures thereof, preferably maleic acid, maleic anhydride or fumaric acid, and of (B) another aliphatic or aromatic acid, such as phthalic acid, phthalic anhydride, isophthalic acid, terephthalic acid, 1,2-cyclohexane dicarboxylic acid, 1,4-cyclohexane dicarboxylic acid or adipic acid, preferably phthalic acid, phthalic anhydride, isophthalic acid or terephthalic acid or mixtures thereof, to react with a slight excess of (C) two or more polyhydric alcohols. The choice of poly-hydric alcohols is crucial for obtaining a flexible, weather-resistant cured product. Thus, polyhydric alcohols, such as ethylene glycol, 1,2-propylene glycol, 1,3-propylene glycol, 1,4-butanediol, 1,6-hexanediol, diethylene glycol, triethylene glycol, dipropylene glycol, tripropylene glycol, 2,2-dimethyl-1,3-propanediol, 2-methyl-1,3-propanediol, 2-butyl-2-ethyl-1,3-propanediol, 2,2,4-trimethyl-1,3-pentanediol, hydroxypivalyl hydroxypivalate, Bisphenol A, trimethylol ethane, trimethylol propane, polyethylene glycol or derivatives thereof, polypropylene glycol or derivatives thereof, polyethylene oxides, polypropylene oxides or tri-methylol propane polymers having an overall hydroxy functionality of 2–4 per molecule and a molecular weight of 300–12,000 are suitable. Preferred polyhydric alcohols are selected from a group consisting of triethylene glycol, dipropylene glycol, tripropylene glycol, Bisphenol A, trimethylol ethane, trimethylol propane, polyethylene oxides, polypropylene oxides and trimethylol propane polymers having an overall hydroxy functionality of 2 or 3 per molecule and a molecular weight of 400–1500, and mixtures thereof. At least two of the required polyhydric alcohols belong preferably to the group consisting of polyethylene glycol, polypropylene glycol, derivatives of polyethylene glycol and derivatives of polypropylene glycol, which include the polymerization products of oxirane and methyl oxirane with itself and/or with alcohols. Particularly preferably at least two of the polyhydric alcohols are selected from the group consisting of polypropylene glycol and derivatives thereof, such as trimethylol propane—polypropylene glycol derivatives and poly-propylen glycol. The ratio of difunctional compounds to trifunctional compounds plays also an important role, and a preferred ratio is 60–80 mol % of diols to 20–40 mol % of triols, but in certain cases only diols are used. Preferred conditions are achieved so that the component comprising triols is used in an amount of 50 mol % at the maximum calculated from the amount of all the polyhydric alcohols. Additionally, an inhibitor known in the art is needed for the prevention of solidification and geleation, the preferred inhibitor being hydroquinone, toluhydroquinone, hydroquinone monomethyl ether, mono-tert-butyl hydroquinone, di-tert-butyl hydroquinone, tri-tert-butyl hydroquinone and butyl toluhydroquinone. The weight-average molecular weight Mw of the linear unsaturated polyester obtained is 20,000–100,000 and the cone and plate viscosity (I.C.I.) of the linear unsaturated polyester is 2 ps/125° C.–20 ps/125° C. Preferably the Mw range is 40,000–100,000 and I.C.I. viscosity range is 5 ps/125° C.–15 ps/125° C. A linear unsaturated polyester with an extremely high molecular weight can thus be obtained and surprisingly it can be readily solubilized and diluted with monomers in a manner similar to that of conventional polyesters, and thus the workability of the liquid base resin is retained.

In order to manufacture liquid base resins the obtained linear unsaturated polyesters are diluted with a reactive monomer or mixtures thereof to obtain mixtures containing 30–60 wt %, preferably 35–55 wt % of a reactive monomer. Reactive monomers suitable for use in the invention include vinyl aromatic monomers, vinyl esters of carboxylic acids, acrylic and methacrylic acid esters, acrylamides and methacrylamides, acrylonitrile and methacrylonitrile, alkyl vinyl ethers, allyl esters of aromatic di- and polyacids, and the like, and mixtures thereof. Preferred reactive monomers are vinyl aromatic monomers, acrylic and methacrylic acid esters, and diallyl esters of aromatic di- and polyacids. A particularly preferred reactive monomer is styrene.

The resulting liquid base resin comprises linear unsaturated polyester obtained by reacting 5–30 mol-% of (A) one or more ethylenically unsaturated dicarboxylic acids, 20–45 mol % of (B) one or more other aliphatic or aromatic acids and 40–60 mol % of (C) two or more polyhydric alcohols, and 30–60 wt %, preferably 35–55 wt % of one or more reactive monomers. The liquid base resin is curable using conventional unsaturated polyester promoter systems (Co-octoate or other systems well known in the art) and as an initiator 1–3 wt % of MEKP, BPO or another suitable peroxide known in the art. The cured product has excellent flexibility also at subzero conditions, and its elongation at break is 150–460%, preferably 300–460% at 20° C. and 20–460%, preferably 150–460% at -20° C.

The loss of elongation properties after a 21-day boiling water test with the cured high molecular weight unsaturated polyester based resin product decreases by 10% at the maximum measured at room temperature and by 50% at the maximum measured at -20° C. corresponding to retention of flexibility greater than 90% and greater than 50% at -20° C., respectively. The retention of flexibility following the severe boiling water tests also speaks for the good stability of the product, and the overall mechanical properties of the product do not change upon exposure to severe conditions, such as boiling water or sub-zero temperatures, even before and after exposure to boiling water. The properties of the products according to the invention resemble those of polyurethanes, which are far more expensive.

The method for the manufacture of the linear unsaturated polyesters and of the unsaturated polyester resins in accordance with the invention is described in the following.

5–30 mol %, preferably 10–20 mol % of (A) one or more ethylenically unsaturated dicarboxylic acid, preferably maleic acid, maleic acid anhydride or fumaric acid, 20–45 mol %, preferably 30–40 mol % of (B) one or more other aliphatic or aromatic acids, such as phthalic acid, phthalic anhydride, isophthalic acid, terephthalic acid, 1,2-cyclohexane dicarboxylic acid, 1,4-cyclohexane dicarboxylic acid or adipic acid and preferably phthalic acid, phthalic acid anhydride, isophthalic acid or terephthalic acid and 40–60 mol %, preferably 45–55 mol % of (C) one or more polyhydric alcohols, such as ethylene glycol, 1,2-propylene glycol, 1,3-propylene glycol, 1,4-butanediol, 1,6-hexanediol, diethylene glycol, triethylene glycol, dipropylene glycol, tripropylene glycol, 2,2-dimethyl-1,3-propanediol, 2-methyl-1,3-propanediol, 2-butyl-2-ethyl-1,3-propanediol, 2,2,4-trimethyl-1,3-pentanediol, hydroxypivalyl hydroxypivalate, Bisphenol A, trimethylol ethane, trimethylol propane, polyethylene oxides, polypropylene oxides or trimethylol propane polymers having an overall hydroxy functionality of 2–4 per molecule and a molecular weight of 300–12,000, and preferably triethylene glycol, dipropylene glycol, tripropylene glycol, Bisphenol A, trimethylol ethane, trimethylol propane, polyethylene oxides, polypropylene oxides or trimethylol propane polymers having an overall hydroxy functionality of 2 or 3 per molecule and a molecular weight of 400–1500 and particularly preferably at least two of the required polyhydric alcohols belong to the group consisting of polyethylene glycol, polypropylene glycol, derivatives of polyethylene glycol and derivatives of polypropylene glycol or mixtures thereof are allowed to polymerize at an elevated temperature as follows:

In the first process stage the acid/acids (B) and at least two polyhydric alcohols (C) are allowed to polymerize at an elevated temperature in a reaction vessel in the presence of a metal catalys, preferably tin catalyst for an extended period of time until an acid value of 5–35, preferably less than 20 is achieved. In the second process stage the ethylenically unsaturated acid (A) is added and the reaction is carried out at an elevated temperature for an extended period of time until the acid value of 5–35, preferably below 20 is achieved. Vacuum is applied if necessary. The process is carried out in a reactor in the presence of an inhibitor, such as hydroquinone. The generated water is removed during the reaction in a suitable manner, such as through a separation column. When linear unsaturated polyesters with extremely high molecular weight of 70,000–100,000 are manufactured the starting materials are allowed to be polymerized for an extended period of time until an acid value of preferably less than 10 and a cone and plate viscosity (I.C.I.) of more than 10 ps/125° C. are achieved at the end of the process.

The ethylenically unsaturated carboxylic acid/acids (A) may alternatively be charged to the reactor in the first process stage or the charging of the ethylenically unsaturated carboxylic acid can be also performed in two steps; one portion of it may be charged with other starting materials and the other portion of it may be added after a selected period of processing.

The thus obtained linear unsaturated polyesters are diluted with reactive monomers to obtain liquid base resins containing 30–60 mol %, preferably 35–55 mol % of a reactive monomer or a mixture thereof, preferably styrene.

It has been surprisingly found that the process with extended processing time until low acid values are achieved yields linear unsaturated polyesters that have very high molecular weights, surprisingly good solubility and improved retention of elongation properties are obtained in the respective cured products. The compounding of polyesters especially from polypropylene glycol derivatives, such as polyoxides allows the exceptionally extended processing times. Usually an extended period of processing time causes geleation which prevents the continuation of the processing. However, according to the invention two different polyhydric alcohols, such as polypropylene glycol derivatives are used in connection with an inhibitor and a metal catalyst and thus the condensation reaction can be continued until very low acid values are achieved thus enabling the manufacture of linear unsaturated polyesters with very high molecular weights. The unsaturated polyester based cured products manufactured of unsaturated polyester resins according to the invention exhibit exceptionally good physical properties such as good subzero flexibility, good elongation properties and good normal flexibility. A further advantage in the use of high molecular weight unsaturated polyester resins according to the invention is that if additional tensile strength is needed in the cured product, the polyester is readily dilutable to higher styrene contents while still retaining good workability of the resin.

The liquid base resin may be used as such, reinforced with glass or with other reinforcing materials known in the art, filled or unfilled, with or without thickeners and optionally blended with other types of resins, e.g. epoxy resins, urethane resins, vinyl esters, or blended with conventional unsaturated polyester resins in order to achieve desired properties in the cured products, such as suitable hardness, UV-resistance, subzero flexibility and weather-resistance.

The unsaturated polyester resins in accordance with the invention can be applied to sealing of concrete elements, to concrete coatings as well as to flooring of structural materials, such as roofs and parking house floorings. The resins in accordance with the invention are well suited for various subzero flexible, weather-resistant applications where good adhesion to supporting material, good flexibility at low temperatures and high impact resistance are needed together with good chemical resistance, water resistance and weather-resistance. Examples of such applications are flexible adhesive resins and sealants, coating resins for metals or lining resins in lining films, insulation materials, resins for laminating flexible moulds and adhesive resins for ceramic plates, window attachments or decorative windows. The resins can also be used as water-proofing resins and multi-purpose resins, and to certain specific applications where thick layers of 2–12 mm thickness with high flexibility are needed. The unsaturated polyester resins in accordance with the invention can also be used as such or with reinforcing agents such as glass fibre, as laminating agents and as a base resin for manufacturing of gelcoats for various applications. The resins as such are suitable for sculpturing, pultrusion and extrusion applications.

The following examples merely illustrate the invention. Those skilled in the art will recognize many variations that are within the spirit of the invention and within the scope of the claims.

EXAMPLE 1

Preparation of a Flexible Unsaturated Polyester Resin A 0.4 molar parts of isophthalic acid, 0.4 molar parts of polypropylene oxide diol and 0.1 molar parts of polypropylene oxide triol are polymerized in a reaction vessel in the presence of a metal catalyst, suitably tin catalyst to an acid value below 10. The mixture is cooled to 100° C. and 0.1 molar parts of maleic acid is added. The reaction is carried on until the acid number is below 20. Vacuum is applied, if necessary. A cone and plate viscosity (I.C.I.) of 11.5 ps at 125° C. is obtained. According to GPC analysis the molecular weight $Mn \approx 7500$ and $Mw \approx 78.000$.

EXAMPLE 2

Application of the Flexible Unsaturated Polyester Resin A

The linear resin A prepared in Example 1 is diluted to 40% styrene and cured with 1–2% of MEKP and a Co-salt. The resulting flexible mould is tested and it exhibits mechanical properties shown in Table 1.

TABLE 1

| Mechanical properties of the cured, flexible unsaturated polyester resin A | |
|---|---|
| I.C.I viscosity (25° C.) in 40% styrene | 5.4 ps |
| elongation at +20° C. | 420% |
| elongation at −20° C. | 210% |
| after boiling water test (21d) | |
| elongation at +20° C. | 400% |
| elongation at −20° C. | 105% |

EXAMPLE 3

Application of the Flexible Unsaturated Polyester Resin A

The linear resin A prepared in Example 1 is diluted with 50% of styrene and cured with 1–2% of MEKP and a Co-salt. The resulting flexible mould was tested and it exhibited elongation of 460% at room temperature.

EXAMPLE 4

Preparation of a Flexible Unsaturated Polyester Resin B 0.4 molar parts of isophthalic acid, 0.4 molar parts of polypropylenoxide diol and 0.1 molar parts of polypropylene oxide triol are polymerized in a reaction vessel in the presence of a metal catalyst to an acid value below 25. The mixture is cooled to 100° C. and 0.1 molar parts of maleic acid is added. The reaction is carried on until the acid value is below 25. Vacuum is applied if necessary. An I.C.I. viscosity of 2.5–5.0 ps at 125° C. is obtained. According to GPC analysis the molecular weight $Mn \approx 3000$ and $Mw \approx 20000$.

EXAMPLE 5

Preparation of a Flexible Unsaturated Polyester Resin C 0.4 molar parts of isophthalic acid, 0.36 molar parts of polypropylene oxide diol, 0.1 molar parts of polypropylene oxide triol, 0.03 molar parts of tripropylene glycol, 0.01 molar parts of Bisphenol A (free or propoxylated) and 0.1 molar parts of maleic acid are polymerized in a reaction vessel in the presence of a suitable tin catalyst to an acid value below 40. Vacuum is applied if necessary. An I.C.I. viscosity of 5.2 ps at 125° C. is obtained. According to GPC analysis the molecular weight $Mn \approx 2900$ and $Mw \approx 25\,000$.

EXAMPLE 6

Application of the Flexible Weather-resistant Resins B and C

The linear resins prepared in Examples 4 and 5 are diluted with styrene 35–40% and cured with 1–2% of MEKP and a Co-salt. As a result flexible moulds are obtained, and the mechanical properties are tested. Results are presented in Table 2 applying a 14-day boiling water test.

TABLE 2

Mechanical properties of flexible resins B and C

| Resin | Resin B | Resin C |
|---|---|---|
| before boiling water test | | |
| I.C.I viscocity (25° C.) in 38% styrene | 2.8 ps | 3.3 ps |
| elongation at +20° C. | 390% | 400% |
| elongation −20° C. | 160% | 210% |
| after boiling water test (14d) | | |
| elongation at +20° C. | 330% | 400% |
| elongation at −20° C. | 130% | 340% |

What is claimed is:

1. An unsaturated polyester resin which, when cured, is flexible and weather-resistant at a temperature below 0° C., wherein the unsaturated polyester resin comprises:
   1) a linear unsaturated polyester with a cone and plate viscosity (I.C.I.) of 2 poise/125° C.–20 poise/125° C. and a molecular weight Mw of 20,000–100,000, wherein the linear unsaturated polyester is obtained by reacting, in the presence of an inhibitor and of a metal catalyst, together:
      5–30 mol % of one or more ethylenically unsaturated dicarboxylic acids (A) selected from the group consisting of maleic acid, maleic anhydride and fumaric acid,
      20–45 mol % of one or more other aliphatic or aromatic acids (B) selected from the group consisting of phthalic acid, phthalic anhydride, isophthalic acid or terephthalic acid, and
      40–60 mol % of two or more polyhydric alcohols (C) selected from the group consisting of triethylene glycol, dipropylene glycol, tripropylene glycol, Bisphenol A, trimethylol ethane, trimethylol propane, polyethylene glycol and derivatives thereof, polypropylene glycol derivatives thereof, polyethylene oxides, polypropylene oxides and trimethylol propane polymers wherein said polyhydric alcohols have an overall hydroxy functionality of 2 or 3 per molecule and a molecular weight of 400 to 1500, and the ratio of difunctional polyhydric alcohols to trifunctional polyhydric alcohols is 60–80 mol %: 20–40 mol %; and
   2) 30–60 wt % of one or more reactive monomers; and that after curing the elongation at break of the cured product is 150–460% at 20° C. and 20–460% at −20° C.

2. An unsaturated polyester resin according to claim 1, wherein the linear unsaturated polyester has a cone and plate viscosity (I.C.I.) of 5 poise/125° C.–15 poise/125° C. and a molecular weight Mw of 40,000–100,000.

3. An unsaturated polyester resin according to claim 1, wherein the linear unsaturated polyester is obtained by reacting together:
   10–20 mol % of one or more ethylenically unsaturated dicarboxylic acids (A),
   30–40 mol % of one more other aliphatic or aromatic acids (B), and
   45–55 mol % of two or more polyhydric alcohols (C).

4. An unsaturated polyester resin according to claim 1, wherein the metal catalyst is tin catalyst and the inhibitor is selected from the group consisting of hydroquinone, toluhydroquinone, hydroquinone monomethyl ether, mono-tert-butyl hydroquinone, di-tert-butyl hydroquinone, tri-tert-butyl hydroquinone and butyl toluhydroquinone.

5. An unsaturated polyester resin according to claim 1, that further comprises one or more conventional resins.

6. An unsaturated polyester resin according to claim 1, wherein the reactive monomer is selected from the group consisting of vinyl aromatic monomers, vinyl esters of carboxylic acids, acrylic and methacrylic acid esters, acrylamides and methacrylamides, acrylonitrile and methacrylonitrile, alkyl vinyl ethers, allyl esters of aromatic di- and polyacids, and mixtures thereof.

7. An unsaturated polyester resin according to claim 1, wherein after curing the elongation at break of the cured product is 300–460% at 20° C. and 150–460% at −20° C.

8. An unsaturated polyester resin according to claim 1, wherein the cured product has a retention of flexibility greater than 90% measured at room temperature and greater than 50% measured at −20° C. following a 21-day boiling test.

9. A process for the manufacture of an unsaturated polyester resin which, when cured, is flexible and weather-resistant at a temperature below 0° C., comprising the steps of:
   reacting 5–30 mol % of one or more ethylenically unsaturated dicarboxylic acids (A) selected from the group consisting of maleic acid, maleic anhydride and fumaric acid, 20–45 mol % of one or more other aliphatic or aromatic acids (B) selected from the group consisting of phthalic acid, phthalic anhydride, isophthalic acid and terephthalic acid, and 40–60 mol % of two or more polyhydric alcohols (C) selected from the group consisting of triethylene glycol, dipropylene glycol, tripropylene glycol, Bisphenol A, trimethylol ethane, trimethylol propane, polyethylene glycol and derivatives thereof, polypropylene glycol and derivatives thereof, polyethylene oxides, polypropylene oxides and trimethylol propane polymers wherein said polyhydric alcohols have an overall hydroxy functionality of 2 or 3 per molecule and a molecular weight of 400–1500, and the ratio of difunctional polyhydric alcohols to trifunctional polyhydric alcohols is 60–80 mol %:20–40 mol %, in a reactor at an elevated temperature in the presence of an inhibitor and a metal catalyst,
   allowing the reaction to proceed until an acid value of 5–35 is reached; and
   diluting the obtained linear unsaturated polyester with 30–60 wt % of one or more reactive monomers.

10. A process according to claim 9, further comprising the steps of:
    reacting 10–20 mol % of one or more ethylenically unsaturated dicarboxylic acids (A), 30–40 mol % of one or more other aliphatic or aromatic acids (B), and 45–55 mol % of two or more polyhydric alcohols,
    allowing the reaction to proceed until an acid value less than 20 is achieved, and
    diluting the obtained linear unsaturated polyester with 35–55 wt % of one or more reactive monomers.

11. A process according to claim 9, wherein the reaction is allowed to proceed until an acid value less than 10 and cone and plate viscosity (I.C.I) of the more than 10 poise/ 125° C. is achieved.

12. A process according to claim 9, wherein the inhibitor is selected from the group consisting of hydroquinone, toluhydroquinone, hydroquinone monomethyl ether, mono-teert-butyl hydroquinone, di-tert-butyl hydroquinone, tri-tert-butyl hydroquinone and butyl toluhydroquinone and the metal catalyst is tin catalyst.

13. A process according to claim 9, wherein in the first stage of the process the aliphatic or aromatic acids (B) and the polyhydric alcohols (C) are allowed to react, then in the second stage of the process the ethylenically unsaturated dicarboxylic acids (A) are added and the reaction is continued for a selected period of time.

14. A process according to claim 9, wherein the reactive monomer is selected from the group consisting of vinyl aromatic monomers, vinyl esters of carboxylic acids, acrylic and methacrylic acid esters, acrylamides and methacrylamides, acrylonitrile and methacrylonitrile, alkyl vinyl ethers, allyl esters of aromatic di- and polyacids, and mixtures thereof.

15. An unsaturated polyester resin according to claim 1, wherein the reactive monomers are 35–55 wt %.

16. An unsaturated polyester resin according to claim 1, wherein at least two of said polyhydric alcohols (C) are selected from the group consisting of polyethylene glycol, polypropylene glycol, derivatives of polyethylene glycol and derivatives of polypropylene glycol.

17. An unsaturated polyester resin according to claim 6, wherein the reactive monomer is styrene.

18. An unsaturated polyester resin according to claim 14, wherein the reactive monomer is styrene.

19. A process according to claim 9, wherein at least two of said polyhydric alcohols (C) are selected from the group consisting of polyethylene glycol, polypropylene glycol, derivatives of polyethylene glycol and derivatives of polypropylene glycol.

20. A process according to claim 9, wherein the ethylenically unsaturated dicarboxylic acids (A) are charged to the reactor in a first stage of the process.

21. A process according to claim 9, wherein the ethylenically unsaturated dicarboxylic acids are charged to the reactor in two steps, comprising:

adding one portion of the ethylenically unsaturated dicarboxylic acids (A) with the aliphatic or aromatic acids (B) and polyhydric alcohols (C) and allowing the reaction to proceed for a selected period of processing; and adding the remaining portion of the ethylenically unsaturated dicarboxylic acids (A) with the aliphatic or aromatic acids (B) and polyhydric alcohols (C) and allowing the reaction to proceed for a selected period of processing.

* * * * *